(12) United States Patent
Koller et al.

(10) Patent No.: US 9,374,734 B1
(45) Date of Patent: Jun. 21, 2016

(54) METHODS AND SYSTEMS FOR USING MOBILE-STATION-SPECIFIC GATEWAY-BURDEN DATA FOR ASSIGNING MOBILE STATIONS TO DATA-ACCESS GATEWAYS

(71) Applicant: Sprint Spectrum L.P., Overland Park, KS (US)

(72) Inventors: Gary Koller, Overland Park, KS (US); Raymond E. Reeves, Oviedo, FL (US); Simon Youngs, Overland Park, KS (US); Mark Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 215 days.

(21) Appl. No.: 13/790,986

(22) Filed: Mar. 8, 2013

(51) Int. Cl.
*H04J 3/00* (2006.01)
*H04W 28/08* (2009.01)

(52) U.S. Cl.
CPC .................... *H04W 28/08* (2013.01)

(58) Field of Classification Search
CPC .............................. H04W 24/08; H04W 24/00
USPC .................................. 370/336, 352
See application file for complete search history.

(56) References Cited

U.S. PATENT DOCUMENTS

| | | | |
|---|---|---|---|
| 8,059,557 B1* | 11/2011 | Sigg et al. | 370/252 |
| 8,447,304 B2* | 5/2013 | Morinaga et al. | 455/436 |
| 2004/0198220 A1* | 10/2004 | Whelan et al. | 455/41.1 |
| 2012/0059934 A1* | 3/2012 | Rafiq et al. | 709/225 |
| 2013/0155965 A1* | 6/2013 | Koodli | 370/329 |
| 2013/0163424 A1* | 6/2013 | Goerke et al. | 370/235 |
| 2013/0223222 A1* | 8/2013 | Kotecha et al. | 370/235 |

* cited by examiner

*Primary Examiner* — Yemane Mesfin
*Assistant Examiner* — Abdelillah Elmejjarmi

(57) ABSTRACT

Disclosed are methods and systems for using mobile-station-specific gateway-burden data for assigning mobile stations to data-access gateways. One embodiment takes the form of a method carried out by at least one network entity in a communication system that includes a radio access network (RAN) for providing wireless service to mobile stations and that further includes multiple data-access gateways. The method includes maintaining mobile-station-specific gateway-burden data that associates each of multiple mobile stations with one or more indicia of the extent to which those mobile stations have respectively consumed one or more resources of one or more of the data-access gateways. The method further includes using the mobile-station-specific gateway-burden data to assign mobile stations among the various data-access gateways such that mobile stations indicated by the mobile-station-specific gateway-burden data as having placed similar burdens on one or more of the gateways are grouped together by assignment to the same respective gateways.

19 Claims, 5 Drawing Sheets

METHODS AND SYSTEMS FOR USING MOBILE-STATION-SPECIFIC GATEWAY-BURDEN DATA FOR ASSIGNING MOBILE STATIONS TO DATA-ACCESS GATEWAYS

BACKGROUND

Unless otherwise indicated herein, the materials described in this section are not prior art to the claims and are not admitted to be prior art by their inclusion in this section.

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. These client-side devices are generally referred to in this disclosure as mobile stations, though this term is intended to broadly encompass various devices known by terms such as mobile devices, access terminals, user equipment, wireless-communication devices, cellphones, smartphones, personal digital assistants (PDAs), tablets, laptops, air cards, Universal Serial Bus (USB) devices (e.g., dongles), and/or any other device(s) capable of functioning as a mobile station according to this disclosure. Via the RAN, mobile stations generally engage in communications such as voice calls, packet-data sessions, text messaging (e.g., Short Message Service (SMS) messaging), and the like.

Furthermore, the wireless communication between the RAN and each mobile station is typically bidirectional in nature. The component of that communication that is sent from the RAN to the mobile station is described as being sent on what is known as the forward link, while the component that is sent from the mobile station to the RAN is described as being sent on what is known as the reverse link. On both links, the wireless communications are typically formatted in accordance with a wireless-communication protocol, one example type of which is code division multiple access (CDMA), where CDMA networks that operate according to industry specifications (IS) such as IS-95 and IS-2000 are often referred to as 1×RTT (or "1×") networks, where 1×RTT stands for Single Carrier Radio Transmission Technology.

Some RANs operate in accordance with a particular type of CDMA protocol known as Evolution Data Optimized (EV-DO). These RANs are generally configured to operate according to one or more versions of IS-856, and are designed to provide high-rate packet-data service to mobile stations using a technique on the forward link known as time-division multiplexing (TDM) and using what is essentially 1× technology on the reverse link. More generally, RANs can be arranged to operate according to any of numerous other protocols, some examples of which are Long Term Evolution (LTE), Universal Mobile Telecommunications System (UMTS), WiMAX (IEEE 802.16), time division multiple access (TDMA), Global System for Mobile Communications (GSM), Wi-Fi (IEEE 802.11), and the like.

In RANs that are of a type known as wireless wide area networks (WWANs) (or cellular wireless networks), the entities with which mobile stations communicate over the air interface are known by terms such as base station and access node, terms that are used at different times in different ways to refer to different entities. For example, the term base station is sometimes used to refer simply to a device also known as a base transceiver station (BTS), which contains the hardware, antennas, and other components that cooperate to actually conduct the over-the-air (OTA) communication with the mobile stations on behalf of the RAN. In LTE networks, a BTS is typically referred to as an eNodeB, which stands for Evolved Node B, named as being an evolved version of a Node B in a UMTS Terrestrial RAN (or UTRAN). At times, however, the term base station or access node is used to refer in combination to (i) one or more BTSs and (ii) a device known as a base station controller (BSC) (or radio network controller (RNC)), which controls the BTS(s) and connects it (them) to the rest of the network and beyond.

Overview

As referenced above, one of the typical types of communication in which mobile stations engage via RANs is packet-data communication. Accordingly, connectivity may be provided between (1) the one or more base stations with which a mobile station is directly communicating and (2) a data-access gateway, which may take the form of one or more computing devices that operate to provide base stations (and in turn mobile stations) with connectivity to one or more packet-switched data networks, such as the Internet for instance. Furthermore, it is often the case that a wireless-service provider will operate multiple data-access gateways. Upon initiating a data session for a given mobile station, the provider will typically assign the mobile station to one of the provider's multiple gateways, so that the mobile station can then conduct its data session via that assigned gateway. In some cases, selection of a gateway for a mobile station is done randomly (using, e.g., a hash function, a round-robin assignment sequence, etc.) In other cases, this selection is done geographically.

Thus, in current implementations, wireless-service providers typically seek a random distribution of mobile stations across the provider's data-access gateways. This generally has the result of approximately balancing the demands (i.e., the burden) placed on each such data-access gateway as, over time, each such data-access gateway is statistically expected to serve approximately the same mix of light data users, moderate data users, and heavy data users, to use three strata of data-usage behavior by way of example only.

It is noted, however, that this "fair" and "balanced" approach to assignment of mobile stations tends to give heavy data users no incentive whatsoever to moderate their data usage, and accordingly the moderate data users and light data users end up suffering degradations in their data rates and corresponding user experiences due to the head-to-head competition for data-access-gateway resources (e.g., processor time, buffer allocations, and the like) that results from the above-described "fair" and "balanced" random distribution of mobile stations among the multiple data-access gateways operated by the provider. This can cause frustration for these moderate and light data users, who often view the situation from the perspective of being a subscriber to purportedly "unlimited" data service.

To address these and other concerns about drawbacks of prior implementations, presently disclosed are methods and systems for using mobile-station specific gateway-burden data for assigning mobile stations to data-access gateways. One embodiment takes the form of a method carried out by at least one network entity in the context of a communication system that includes a RAN, and further includes a plurality of data-access gateways each arranged to provide data-access service to mobile stations assigned respectively thereto.

In accordance with the embodiment, the method includes maintaining mobile-station-specific gateway-burden data that associates each of multiple mobile stations with one or more indicia of the extent to which those mobile stations have respectively consumed one or more resources of one or more of the data-access gateways. The method further includes using the mobile-station-specific gateway-burden data to assign mobile stations among the various data-access gateways such that mobile stations indicated by the mobile-station-specific gateway-burden data as having placed similar burdens on one or more of the data-access gateways are grouped together by assignment to the same respective data-access gateways.

Another embodiment takes the form of at least one network entity that includes a communication interface, a processing unit, and non-transitory data storage containing program instructions executable by the processing unit to carry out functions of the just-described method. The present methods and systems can encourage users of mobile stations to moderate their respective amount and/or rate of data consumption.

These as well as aspects, advantages, and alternatives will become apparent to those of ordinary skill in the art by reading the following description, with reference where appropriate to the accompanying drawings. Further, it should be understood that this overview and the other description throughout this document are provided by way of example and are not intended to be limiting.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present methods and systems will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
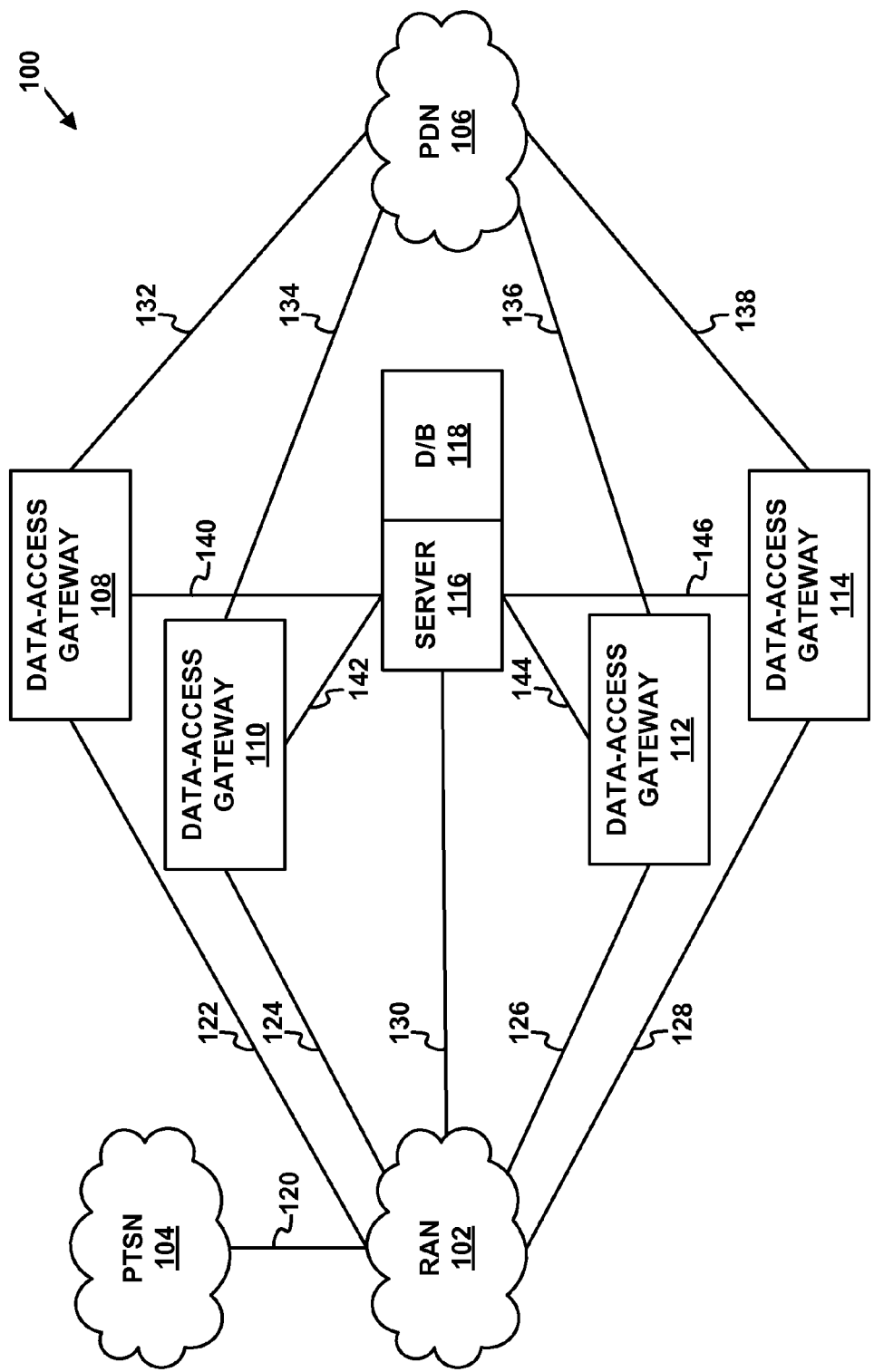
FIG. 1 depicts an example communication system.

Referring to the drawings, FIG. 1 depicts a communication system 100 that includes a RAN 102, a public switched telephone network (PSTN) 104, a packet-data network (PDN) 106, a data-access gateway 108, a data-access gateway 110, a data-access gateway 112, a data-access gateway 114, a server 116, and a database 118. In this example, server 116 is connected to database 118. Other entities could be present in addition to and/or instead of one or more entities depicted in FIG. 1, as this arrangement is presented by way of example. And other variations are possible as well.

RAN 102 communicates with PSTN 104 via a communication link 120, with data-access gateway 108 via a communication link 122, with data-access gateway 110 via a communication link 124, with data-access gateway 112 via a communication link 126, with data-access gateway 114 via a communication link 128, and with server 116 via a communication link 130. PDN 106 communicates with data-access gateway 108 via a communication link 132, with data-access gateway 110 via a communication link 134, with data-access gateway 112 via a communication link 136, and with data-access gateway 114 via a communication link 138. Server 116 communicates with data-access gateway 108 via a communication link 140, with data-access gateway 110 via a communication link 142, with data-access gateway 112 via a communication link 144, and with data-access gateway 114 via a communication link 146. Any or all of the communication links described herein may be bidirectional and may include one or more wired and/or wireless interfaces. Also, there could be one or more routers, switches and/or other devices or networks making up at least part of one or more of each of the communication links described herein.

Each of data-access gateway 108, data-access gateway 110, data-access gateway 112, and data-access gateway 114 generally functions to provide data-access service to served mobile stations. As such, any one or any combination of the data-access gateways described herein can route data packets to and from RAN 102 and/or PDN 106, which could be the Internet and/or a private Internet Protocol (IP) network. As examples, any one or any combination of the data-access gateways described herein could be or include one or more entities such as a home agent, a packet data serving node (PDSN), a network access server (NAS), a packet data gateway (PDG), and a serving data gateway (SDG). And other entities and/or types of entities are possible as well, as these are listed here by way of example.

Again by way of example only, any one or any combination of data-access gateway 108, data-access gateway 110, data-access gateway 112, data-access gateway 114, and/or server 116 may, among other operations, carry out one or more of the functions described herein as being carried out by at least one network entity.

B. Example Radio Access Network (RAN)

Figure 2:
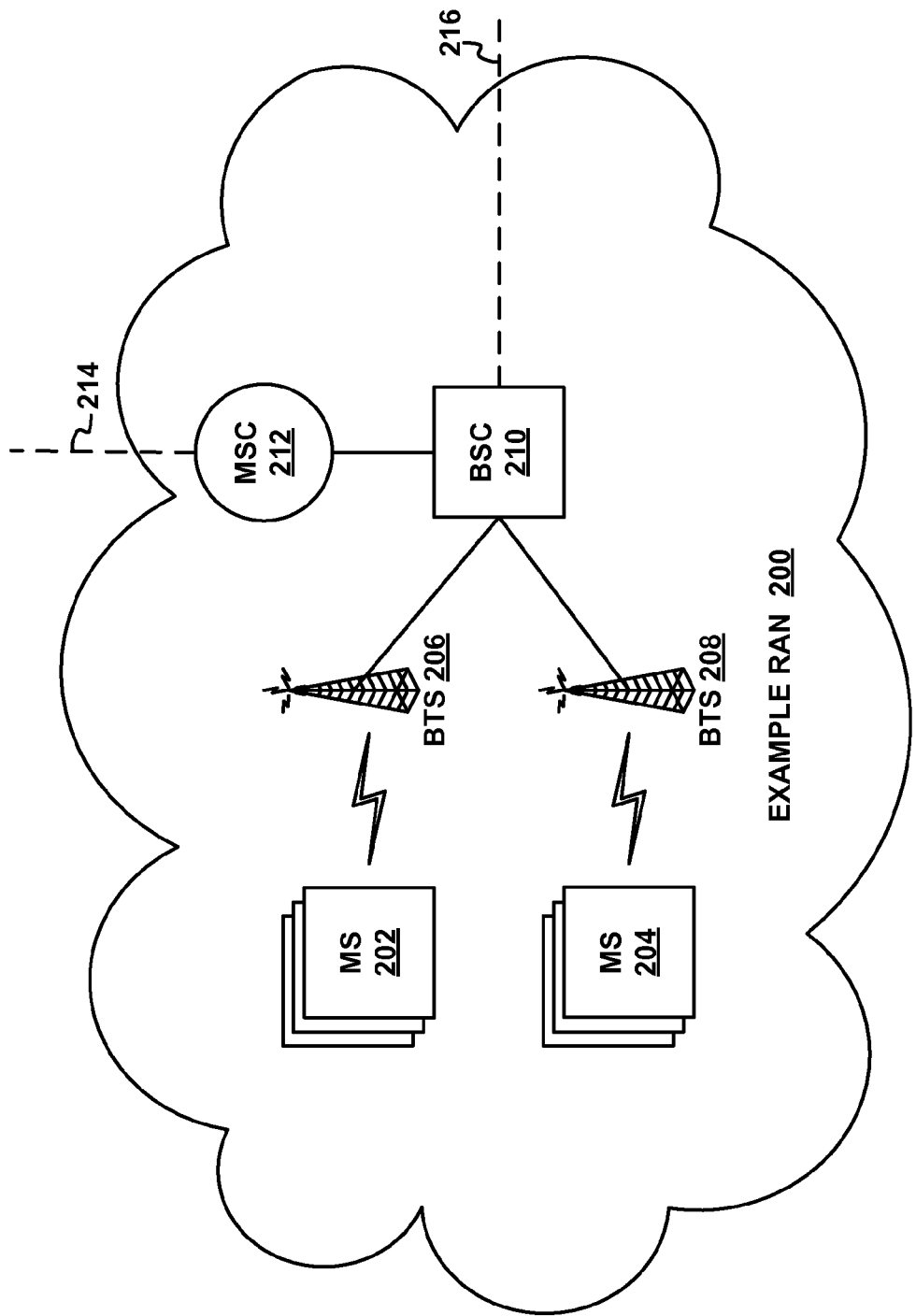
FIG. 2 depicts an example radio access network (RAN) in the context of the example communication system of FIG. 1.

FIG. 2 depicts an example RAN 200, where the RAN 102 of FIG. 1 may have a structure and arrangement similar to that of the example RAN 200 of FIG. 2. RAN 200 is depicted as including a plurality of mobile stations 202 being served by a BTS 206, a second plurality of mobile stations 204 being served by a second BTS 208, a BSC 210, and a mobile switching center (MSC) 212. Other entities could be present in addition to and/or instead of one or more entities depicted in FIG. 2, as this arrangement is presented by way of example. And other variations are possible as well.

BTS 206 and BTS 208 each communicate with BSC 210 via a respective communication link, and BSC 210 in turn communicates with MSC 212 via a communication link. MSC 212 communicates with PTSN 104 via a communication link 214. Communication link 214 may represent communication link 120. BSC 210 communicates with data-access gateway 108, data-access gateway 110, data-access gateway 112, and data-access gateway 114 via a communication link 216. Communication link 216 may represent any one or any combination of communication link 122, communication link 124, communication link 126, and communication link 128.

Each of BTS 206 and BTS 208 generally functions to provide wireless-communication service to mobile stations in their respective coverage areas, as described herein, and to bridge air-interface communications with mobile stations on the one hand and backhaul communications with BSC 210 on the other hand. BSC 210 generally functions to control one or more BTSs, and to provide one or more BTSs with connections to devices such as MSC 212, data-access gateway 108, data-access gateway 110, data-access gateway 112, and data-access gateway 114. MSC 212 generally functions to connect BSCs to circuit-switched networks such as PSTN 104, and serves at least a telephone-switch function to facilitate such connections.

C. Example Network Entity

Figure 3:
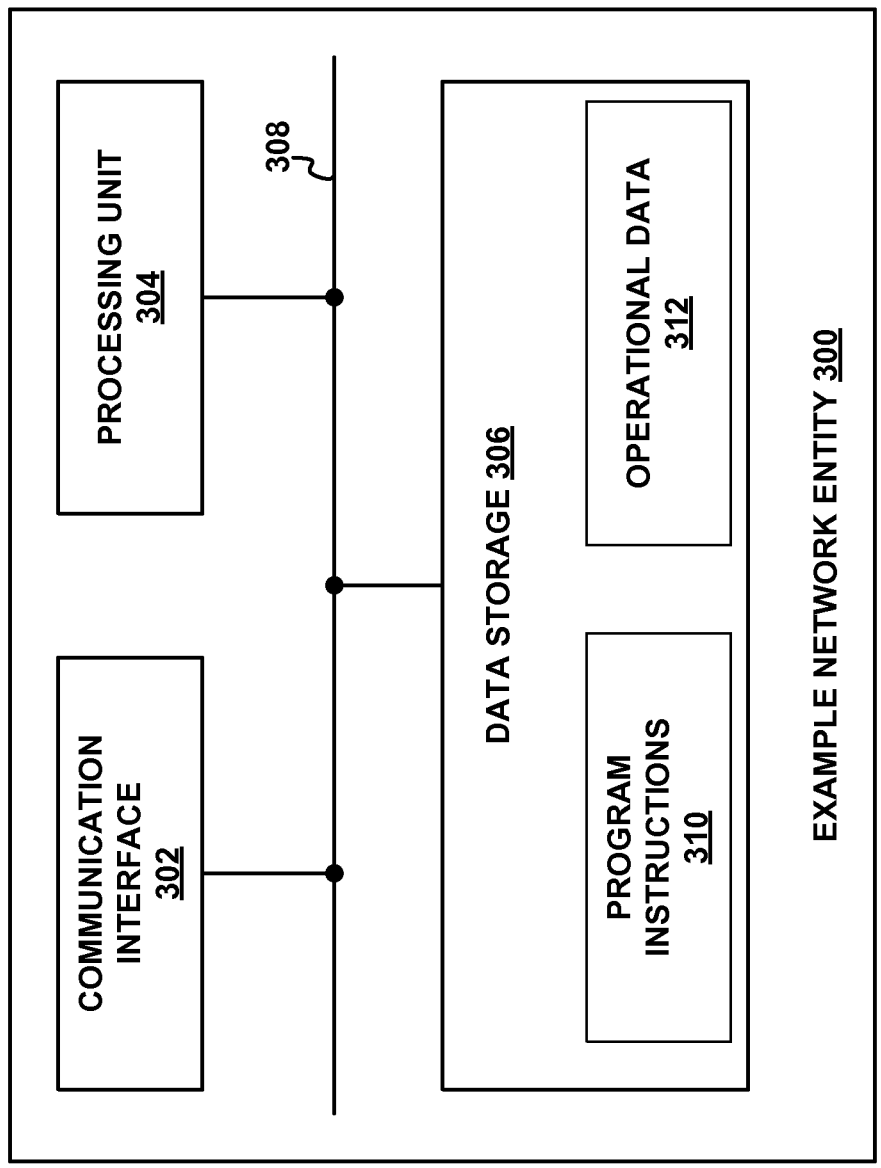
FIG. 3 depicts an example network entity.

FIG. 3 depicts an example network entity 300, such as data-access gateway 108, data-access gateway 110, data-access gateway 112, data-access gateway 114, and server 116, as but a few examples, though any network-side communication entity described herein may have a structure similar to that described with respect to entity 300. As shown, entity 300 may include a communication interface 302, a processing unit 304, and data storage 306, all of which may be coupled together by a system bus, network, or other communication mechanism 308.

Communication interface 302 may include one or more interfaces (e.g., Ethernet) for engaging in wired communication and/or one or more interfaces (e.g., LTE, Wi-Fi) for engaging in wireless communication. Processing unit 304 may comprise one or more general-purpose and/or one or more special-purpose processors, and may be integrated in whole or in part with communication interface 302. Data storage 306 may comprise one or more volatile storage components (such as magnetic, optical, flash, or other non-transitory storage) and may be integrated in whole or in part with processing unit 304. As shown, data storage 306 may hold program instructions 310 that are executable by processing unit 304 to carry out various functions. Additionally, data storage 306 may hold operational data 312 which comprises information that is collected and stored as a result of the functions carried out by executed program instructions 310. And other configurations are possible as well.

Entity 300 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

D. Example Mobile Station

Figure 4:
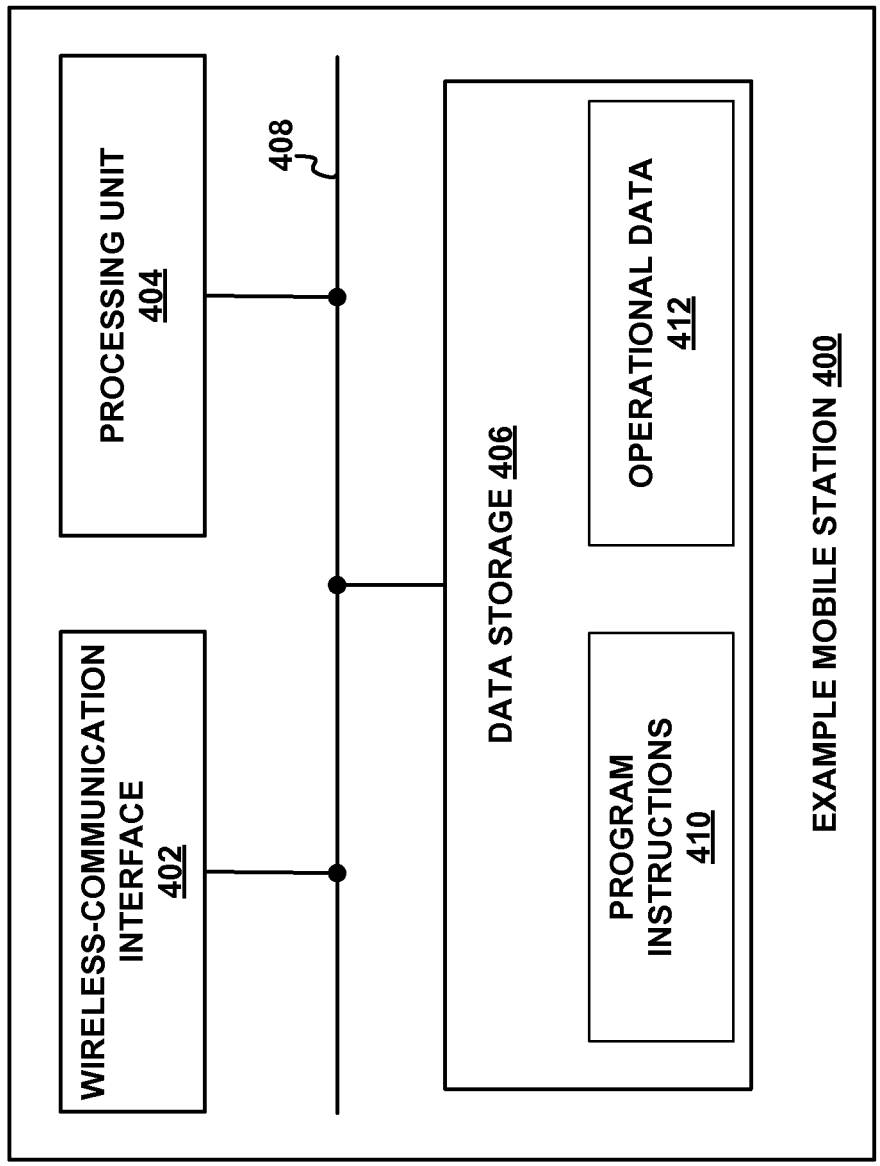
FIG. 4 depicts an example mobile station.

FIG. 4 depicts an example mobile station 400, such as any one of the mobile stations among the first plurality of mobile stations 202 and/or the second plurality of mobile stations 204, though any device arranged to carry out mobile-station functions described herein may have a structure similar to that described with respect to entity 400. As shown, entity 400 includes a wireless-communication interface 402, a processing unit 404, and data storage 406, all of which may be coupled together by a system bus, network, or other communication mechanism 408.

Wireless-communication interface 402 may comprise one or more antennae and one or more chipsets for communicating with one or more base stations over respective air interfaces. As an example, one such chipset could be suited for LTE communication. As another example, one such chipset could be suited for CDMA (e.g., EV-DO) communication. Wireless-communication interface 402 may also or instead be arranged to communicate according to one or more other types of wireless communication (e.g., protocols) mentioned herein and/or any others now known or later developed.

Processing unit 404 may comprise one or more general-purpose processors and/or one or more special-purpose processors, and may be integrated in whole or in part with wireless-communication interface 402. Data storage 406 may comprise one or more volatile and/or non-volatile storage components (such as magnetic, optical, flash, or other non-transitory storage), and may be integrated in whole or in part with processing unit 404. As shown, data storage 406 may hold program instructions 410 executable by processing unit 404 for carrying out various mobile-station functions described herein. Additionally, data storage 406 may hold operational data 412 which comprises information that is collected and stored as a result of the functions carried out by executed program instructions 410. And certainly other configurations are possible.

Entity 400 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

III. Example Operation

Figure 5:
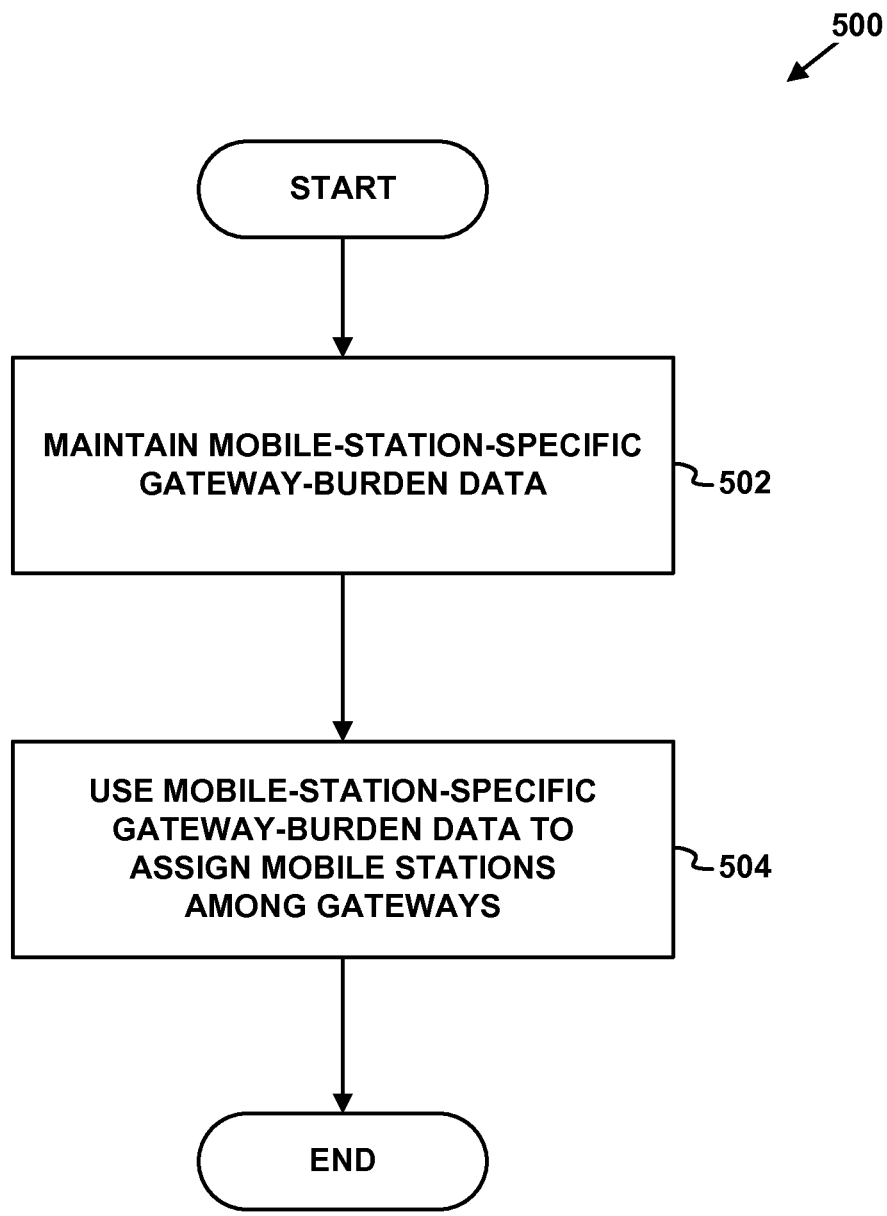
FIG. 5 depicts functions carried out in accordance with at least one embodiment.

FIG. 5 is a flowchart that depicts functions carried out in accordance with at least one embodiment. More particularly, FIG. 5 depicts a method 500 carried out by at least one network entity in the context of a communication system that includes a RAN providing wireless-communication service to mobile stations, and further includes a plurality of data-access gateways each arranged to provide data-access service to mobile stations respectively assigned thereto. In at least one embodiment, the wireless-communication service comprises CDMA service. Moreover, in at least one embodiment, the wireless-communication service comprises LTE service. Furthermore, in at least one embodiment, one or more of the data-access gateways in the plurality comprises one or more entities selected from the group consisting of a home agent, a PDSN, a NAS, a PDG, and an SDG.

Method 500 begins at 502 with maintaining mobile-station-specific gateway-burden data that associates each of multiple mobile stations with one or more indicia of the extent to which those mobile stations have respectively consumed one or more resources of one or more of the data-access gateways. In at least one embodiment, the at least one network entity comprises a server, and the server maintains the mobile-station-specific gateway-burden data. Additionally or alternatively, one or more of the data-access gateways in the plurality could maintain the mobile-station-specific gateway-burden data. And other entities and/or types of entities could maintain the mobile-station-specific gateway-burden data as well.

Moreover, in at least one embodiment, one or more of the one or more indicia is selected from the group consisting of a count, a decimal, a fraction, a percent, and a Boolean flag. Furthermore, in at least one embodiment, one or more of the one or more resources is selected from the group consisting of processor cycles, buffer capacity, storage space, air-interface time, data tonnage, and message transmission.

Method 500 continues at step 504 with using the mobile-station-specific gateway-burden data to assign mobile stations among the various data-access gateways such that mobile stations indicated by the mobile-station-specific gateway-burden data as having placed similar burdens on one or more of the data-access gateways are grouped together by assignment to the same respective data-access gateways. In at least one embodiment, the at least one network entity comprises a server, and the server uses the mobile-station-specific gateway-burden data to assign mobile stations among the various data-access gateways. Additionally or alternatively, one or more of the data-access gateways in the plurality could use the mobile-station-specific gateway-burden data to assign mobile stations among the various data-access gateways. And other entities and/or types of entities could use the mobile-station-specific gateway-burden data to assign mobile stations among the various data-access gateways as well.

Moreover, in at least one embodiment, using the mobile-station-specific gateway-burden data to assign the mobile stations among the various data-access gateways involves using the mobile-station-specific gateway-burden data to respectively associate each of the mobile stations with one of a plurality of burden categories, and also involves assigning the mobile stations among the various data-access gateways such that mobile stations that are associated with the same burden category are grouped together by assignment to the same respective data-access gateways. And in at least one such embodiment, there are three categories. One or more of the burden categories could be light burden, moderate burden, and heavy burden, as but a few examples, though other burden categories and/or other types of burden categories are possible as well.

Furthermore, in at least one embodiment, using the mobile-station-specific gateway-burden data to assign the mobile stations among the various data-access gateways involves using the mobile-station-specific gateway-burden data to determine an average burden metric for each of the mobile stations, and also involves assigning the mobile stations among the various data-access gateways such that mobile stations having similar average burden metrics are grouped together by assignment to the same respective data-access gateways.

In at least one embodiment, method 500 further involves receiving at least some of the mobile-station-specific gateway-burden data from one or more of the data-access gateways in the plurality. Moreover, in at least one embodiment, maintaining the mobile-station-specific gateway-burden data involves maintaining one or more burden profiles respectively associated with one or more of the mobile stations, and using the mobile-station-specific gateway-burden data to assign mobile stations among the various data-access gateways involves using the one or more burden profiles to assign mobile stations among the various data-access gateways. And in at least one such embodiment, method 500 further involves receiving at least some of the mobile-station-specific gateway-burden data from one or more of the data-access gateways in the plurality, and also involves using at least some of the received gateway-burden data for updating one or more of the burden profiles. In at least one embodiment, the communication system comprises a database, and one or more of the burden profiles are stored on the database. Additionally or alternatively, one or more burden profiles could be stored on a server and/or one or more of the data-access gateways in the plurality. And one or more burden profiles could be stored on other entities and/or types of entities as well.

Mobile-station-specific gateway-burden data could take various different forms in various different embodiments. In at least one embodiment, the mobile-station-specific gateway-burden data is specific to a given type of time period, and using the mobile-station-specific gateway-burden data to assign mobile stations among the various data-access gateways involves using the mobile-station-specific gateway-burden data to assign mobile stations among the various data-access gateways during a time period of the given type. And in at least one such embodiment, method 500 is carried out with respect to each of multiple types of time periods. One or more types of time periods could be one or more hours (e.g., 9:00 am to 5:00 pm) during one or more weekdays, weekday nights, and weekends, as but a few examples, though any types of time periods could be used, such as one or more minutes, hours, and/or days.

Moreover, in at least one embodiment, the mobile-station-specific gateway-burden data is also application-specific, and using the mobile-station-specific gateway-burden data to assign mobile stations among the various data-access gateways involves using the mobile-station-specific gateway-burden data to assign mobile stations among the various data-access gateways according to each respective mobile station's most burdensome application.

Furthermore, in at least one other embodiment in which the mobile-station-specific gateway-burden data is application-specific, using the mobile-station-specific gateway-burden data to assign mobile stations among the various data-access gateways involves using the mobile-station-specific gateway-burden data to assign mobile stations among the various data-access gateways on an application-specific basis, such that one or more of the mobile stations are assigned to one gateway for one application and to another gateway for another application.

IV. Conclusion

While some example embodiments have been described above, those of ordinary skill in the art will appreciate that numerous changes to the described embodiments could be made without departing from the scope and spirit of the claims.

What is claimed is:

1. In a communication system comprising a radio access network (RAN) for providing wireless-communication service to a plurality of mobile stations, the communication system further comprising a plurality of data-access gateways arranged to provide data-access service to the plurality of mobile stations assigned respectively thereto, a method carried out by at least one network entity, the method comprising:

maintaining mobile-station-specific gateway-burden data respectively for each of the plurality of mobile stations, wherein the mobile-station-specific gateway-burden data for each mobile station specifies, respectively for each data-access gateway of the plurality of data-access gateways, one or more indicia of an extent to which each of a plurality of software applications on each respective mobile station have consumed one or more resources of the data-access gateway; and using the mobile-station-specific gateway-burden data to assign the plurality of mobile stations among the plurality of data-access gateways on an application-specific basis such that one or more of the mobile stations are assigned to a first data-access gateway of the plurality of data-access gateways for a first software application and to a second data-access gateway of the plurality of data-access gateways for a second software application.

2. The method of claim 1, wherein the wireless-communication service comprises code division multiple access (CDMA) service.

3. The method of claim 1, wherein the wireless-communication service comprises long-term evolution (LTE) service.

4. The method of claim 1, wherein the data-access gateways in the plurality comprises one or more of a home agent, a packet data serving node (PDSN), a network access server (NAS), a packet data gateway (PDG), and a serving data gateway (SDG).

5. The method of claim 1, wherein the at least one network entity comprises a server, and wherein the server maintains the mobile-station-specific gateway-burden data.

6. The method of claim 1, wherein the one or more indicia comprises one or more of a count, a decimal, a fraction, a percent, and a Boolean flag.

7. The method of claim 1, wherein the one or more resources comprises one or more of processor cycles, buffer capacity, storage space, air-interface time, data tonnage, and message transmission.

8. The method of claim 1 further comprising receiving at least some of the mobile-station-specific gateway-burden data from one or more of the data-access gateways in the plurality.

9. The method of claim 1, wherein maintaining the mobile-station-specific gateway-burden data comprises maintaining one or more burden profiles respectively associated with one or more of the plurality of mobile stations, and wherein using the mobile-station-specific gateway-burden data to assign mobile stations among the plurality of data-access gateways comprises using the one or more burden profiles to assign the plurality of mobile stations among the plurality of data-access gateways.

10. The method of claim 9, further comprising:
receiving at least some of the mobile-station-specific gateway-burden data from one or more of the data-access gateways in the plurality; and
using at least some of the received gateway-burden data for updating one or more of the burden profiles.

11. The method of claim 1, wherein the at least one network entity comprises a server, and wherein the server uses the mobile-station-specific gateway-burden data to assign the plurality of mobile stations among the plurality of data-access gateways.

12. The method of claim 1, wherein using the mobile-station-specific gateway-burden data to assign the plurality of mobile stations among the plurality of data-access gateways comprises:
using the mobile-station-specific gateway-burden data to respectively associate each of the plurality of mobile stations with one of a plurality of burden categories; and
assigning the plurality of mobile stations among the plurality of data-access gateways such that mobile stations that are associated with the same burden category are grouped together by assignment to the same respective data-access gateways.

13. The method of claim 12, wherein the plurality of burden categories consists of three categories.

14. The method of claim 1, wherein using the mobile-station-specific gateway-burden data to assign the plurality of mobile stations among the plurality of data-access gateways comprises:
using the mobile-station-specific gateway-burden data to determine an average burden metric for each of the plurality of mobile stations; and
assigning the mobile stations among the plurality of data-access gateways such that mobile stations having similar average burden metrics are grouped together by assignment to the same respective data-access gateways.

15. The method of claim 1, wherein the mobile-station-specific gateway-burden data is specific to a given type of time period, and wherein using the mobile-station-specific gateway-burden data to assign mobile stations among the plurality of data-access gateways comprises using the mobile-station-specific gateway-burden data to assign mobile stations among the plurality of data-access gateways during a time period of the given type.

16. The method of claim 15, carried out with respect to each of multiple types of time periods.

17. The method of claim 1, wherein using the mobile-station-specific gateway-burden data to assign mobile stations among the plurality of data-access gateways comprises using the mobile-station-specific gateway-burden data to assign mobile stations among the plurality of data-access gateways according to each respective mobile station's most burdensome software application.

18. A system comprising:
a communication interface;
a processing unit;
non-transitory data storage; and
program instructions stored in the non-transitory data storage and executable by the processing unit to carry out functions including:
maintaining, for a plurality of data-access gateways arranged to provide data-access service to mobile stations assigned respectively thereto, mobile-station-specific gateway-burden data respectively for each of the plurality of mobile stations, wherein the mobile-station-specific gateway-burden data for each mobile station specifies, respectively for each data-access gateway of the plurality of data-access gateways, one or more indicia of an extent to which each of a plurality of software applications on each respective mobile station have consumed one or more resources of the data-access gateway; and
using the mobile-station-specific gateway-burden data to assign the plurality of mobile stations among the plurality of data-access gateways on an application-specific basis such that one or more of the mobile stations are assigned to a first data-access gateway of the plurality of data-access gateways for a first software application and to a second data-access gateway of the plurality of data-access gateways for a second software application.

19. A non-transitory computer-readable medium having program instructions stored therein and executable by a computing device to cause the computing device to carry out functions including:
maintaining, for a plurality of data-access gateways arranged to provide data-access service to mobile stations assigned respectively thereto, mobile-station-specific gateway-burden data respectively for each of the plurality of mobile stations, wherein the mobile-station-specific gateway-burden data for each mobile station specifies, respectively for each data-access gateway of the plurality of data-access gateways, one or more indicia of an extent to which each of a plurality of software applications on each respective mobile station have consumed one or more resources of the data-access gateway; and using the mobile-station-specific gateway-burden data to assign the plurality of mobile stations among the plurality of data-access gateways on an application-specific basis such that one or more of the mobile stations are assigned to a first data-access gateway of the plurality of data-access gateways for a first software application and to a second data-access gateway of the plurality of data-access gateways for a second software application.

* * * * *